Oct. 7, 1941.    A. H. J. DE LASSUS SAINT GENIES    2,258,558
APPARATUS FOR OBTAINING PHOTOGRAPHS IN COLOR BY PROJECTION COPYING
Filed March 10, 1939
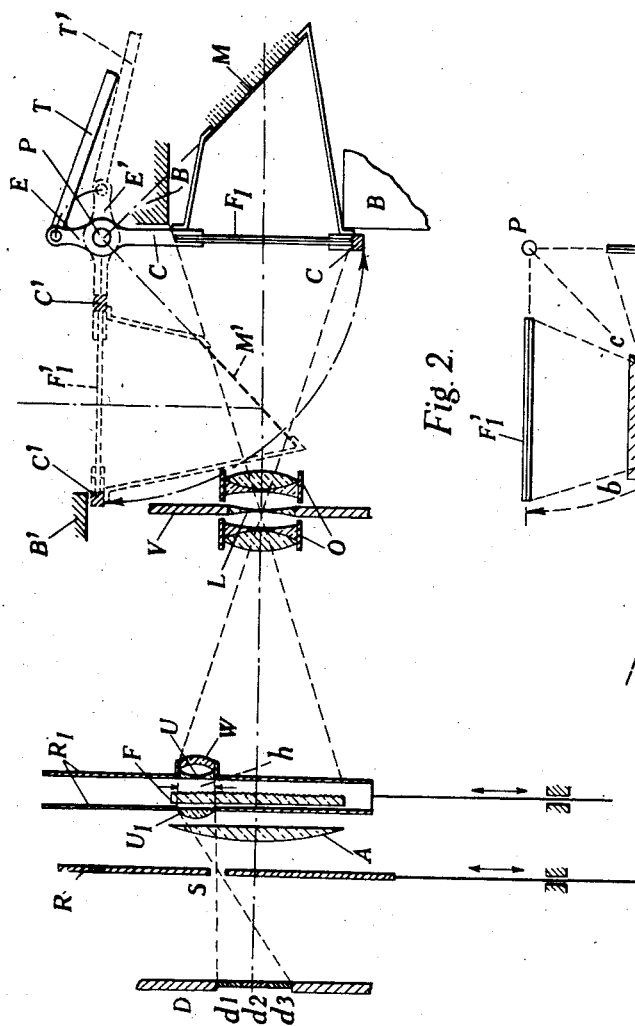
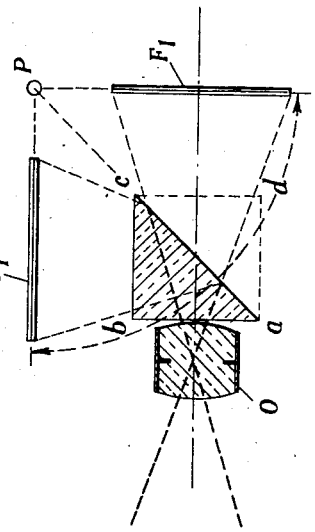

Patented Oct. 7, 1941

2,258,558

UNITED STATES PATENT OFFICE 2,258,558

APPARATUS FOR OBTAINING PHOTOGRAPHS IN COLOR BY PROJECTION COPYING

Anne Henri Jacques de Lassus Saint Genies, Versailles, France

Application March 10, 1939, Serial No. 261,066
In France March 18, 1938

5 Claims. (Cl. 88—24)

The present invention relates to an apparatus for copying by projection color films of all kinds, whether lenticular, of the trichrome color-screen (reseau) type, or colored by subtractive synthesis, the copy film being of the type having two or more sensitised layers distributed on one or both faces of the film, and the properties of these layers being such that the records thereon must necessarily be made through one or the other face of said copy film.

Films of this type, suitable for the reproduction of originals in colors, irrespective of the nature of the originals, and destined for viewing or for projection by the method of subtractive synthesis, are known. In order on the one hand to ensure, in the course of exposure, that the various layers of emulsion of such copy films shall be so illuminated that at least one of them is illuminated only by means projecting one of the monochromes of the original, and on the other hand to enable the operations of coloring or of developing in colors each of the said layers of emulsion to be easily separated, it is known either to isolate one of the layers from the others by means of varnish or appropriate coloring, or to render these layers severally sensitive to different zones of the spectrum. It thus comes about that the rays intended to illuminate one at least of the layers of emulsion cannot effectively traverse the other layers or layers, and it becomes imperative to adopt the procedure of exposing films of this description through both their faces.

But this exposing through both faces requires that the monochrome images thus recorded by the illumination of the one and the other face shall be as accurately registered as possible, and the present invention provides a solution of this problem by optical projection.

According to the invention, after exposure by projection of the monochrome or monochromes which the copy film is capable of recording by one of its faces, an exposure is made through the other face with the interposition of suitable mechanical elements and auxiliary optical systems of such a nature that the copy film is moved, by a displacement equivalent to one revolution, from its initial position to a new position in which, owing to the use of suitable and supplementary optical means for obtaining reflection, the monochrome image or images remaining to be derived from the original is recorded on it by projection. The present invention also consists in ensuring automatically and reliably the exact registering of the various images projected in succession onto the two faces of the copy film, by the adjustment, made once and for all, of mechanical elements and of auxiliary optical means.

The application of the invention permits of the use in optical printing, of the same main optical system for copying different monochromes derived from the original, each of these monochromes being projected by the beam of rays suitably selected to ensure in the first place the selection of this monochrome on the original and the illumination of the layer corresponding thereto on the copy film, and in the second place the exposing of the copy film on both sides without reversing the original film.

A diagrammatic representation of the mechanical and optical means according to the invention is shown by way of example in the accompanying drawing, in which:

Fig. 1 shows the apparatus for use when the reflecting member is a mirror, while Fig. 2 shows the same arrangement when this member is a totally reflecting prism.

Fig. 1, which is illustrative without restricting the invention, is an axial section of the optical copying system for use in the case in which the main copying system O is an objective having a small relative aperture (the purpose of which feature will be explained in due course). $F_1$ is a copy film having a plurality of layers of emulsion, shown in the position in which it is directly illuminated by the objective O. B represents the main structure of the printer comprising the usual parts (not shown), including the sprockets for the feeding of the film.

If, as has already been said, the copy film be caused to occupy alternatively two positions $F'_1$ and $F''_1$ forming a certain angle between them, the copying, in the case of the three color process for example, of one or of two of the monochromes of an original film F may take place in the position $F'_1$ through the optical system O only, through the intermediary of desired radiations; the copying of the other monochromes or of the last monochrome may then be effected in the position $F''_1$ by reflecting the beams merging from O by means of a mirror placed at M'. Since the displacement of the film from $F_1$ to the position $F''_1$ is equivalent to a simple rotation of its plane, it will be understood that the reflecting plane of the mirror must be positioned in the plane bisecting the angle of this rotation.

Embodiments of the invention will now be considered in which the consecutive positions $F_1$ and $F'_1$ of the copy film are occupied by this film throughout a single unwinding, preferably of the original film and of the copy film.

The displacement of the copy film may necessitate displacement of the gate C in which the copy film travels on an endless path, by a substantially rotational movement which will bring this gate from the position C to a position C' and the film from the position $F_1$ to the position $F'_1$. The desired exposures take place for each complete image of the original on the two faces of the copy film, through the intermediary of selected radiations, using the necessary consecutive cut-outs, particularly that which must accompany displacement of the copy film from $F_1$ to $F'_1$.

Fig. 1 gives an example of how the displacement of the copy film is effected by a mechanical rotation, for instance, of the gate C on a pivot P fixed to the main structure B of the printer. Since the system of feed sprockets and their controlling mechanism is housed in the fixed body B, and preferably kept stationary therewith, the only part C of the gate capable of constraining the film without any possible slip thereof is moved by suitable mechanical means comprising in particular, and by way of example, a small connecting-rod T articulated to an arm E which is integral with C. The assembly of moving parts is made as light as possible so as to allow of swinging the film in an extremely short space of time.

The gate C may be assembled, likewise in such a manner so as to be very light and rigid, with a mirror M the plane of which forms an exactly predetermined angle with the plane of the copy film. It is sufficient for the assembly CM to turn through an angle which is double that formed between the mirror M and the plane of $F_1$, provided always that the new position $F'_1$ of the copy film be completely clear of the cone of the rays emerging from the objective O, so that after an exposure of one of the sides of the copy film the exposure of the other side may take place.

If the original film to be copied is a lenticular film it will be desirable, in order to provide a printer occupying as little space as possible, to apply a copying method which allows of the use of a main objective having a small relative aperture and of small size. To this end Fig. 1 shows, on the side of the original, for example, the mode of copying disclosed in Patents No. 2,135,396 patented November 1, 1938, No. 2,136,327, patented November 8, 1938, and No. 2,188,019 patented Jan. 23, 1940.

In this figure, D is a window which delimits the illuminating surface consisting for example of a diffusive plate having three zones $d_1$, $d_2$ and $d_3$. Between D and F there is displaced, in the plane of the drawing, a shutter R provided with a slot S disposed parallel to the lenticulations; owing to this slot only a certain portion b of the film F is illuminated at any one time.

The lens A placed in the vicinity of the film F, on its smooth side, has for its object to form an image of the window D in the plane containing the image of the filter used in the recording of the film, which plane is coincident, moreover, with the entrance pupil of the objective O. The film F is encased by two movable shutters $R_1$ the apertures of which, of the breadth $h$, are provided the movable optical systems U, $U_1$ and W.

As disclosed in detail in Patents No. 2,135,396 patented November 1, 1938, No. 2,136,327 patented November 8, 1938 and No. 2,188,019 patented Jan. 23, 1940, referred to above, the effect of the lens U which is displaced at the side of the lenticulations is to reduce the angular aperture of the beams of light proceeding from the film F and to cause them to pass correctly through the narrow aperture diaphragm of the objective O. It obtains this result in combination with the lens $U_1$, of the opposite sign which is displaced near the opposite face of the film F, the lens W which in the example under consideration may be a cylindrical glass has for its object to compensate for the slight apparent slipping of the image on the copy film $F_1$ which would be occasioned by the moving lens U if used by itself.

It will be understood that when a lenticular film F of this type is being copied onto a smooth film, no moving member is required on the copy film side.

Fig. 2 shows a modification in which the mirror is replaced by a totally reflecting prism abc. In this case it is advisable, for exposing the film in the position $F_1$ to employ a thick glass abcd with parallel faces, which ensures the same optical course of the light rays as in the prism used to expose the illuminated surface in the position $F'_1$. It is preferably in a case of this kind to work out the dimensions of the objective O and of the glass or prism in such a manner that the images recorded at one or the other surface of the copy film shall be as perfectly rectified as is desirable in the circumstances of the case. To this end it is expedient to provide an objective O having a small aperture and, preferably, a small angular field, that is to say, a great focal length.

When the original film is a lenticular film an important advantage of the method results from the successive exposures without any reversing or displacing of the original film. In effect, changing the orientation of the lenticular face of this film for successive exposures would necessitate as is known, modification of the auxiliary optical system placed in the vcinity of this film and the positioning of this system between this film and the principle lens O. The superposition of the images projected on the two faces of the copy film would then be much more difficult and indeed practically speaking impossible of realisation.

There could be introduced, by means for example of a member V, preferably sliding or turning in the plane of the diaphragm of the objective O, lenses L of very great focal length for taking account of the different wavelengths of the rays successively used for projecting the monochromes without appreciably affecting the curvature of the images gathered on the copy film; and this of course only in the case in which the main lens O would not be rectified simultaneously for all these rays.

With the same object of ensuring focussing of the images on the two faces of the film it is also possible, for taking account of the different wavelengths of the rays used, to trace the two positions of the gates C and C' relatively to the main optical system O, at distances measured on the different optical paths between them of the desired extremely small value.

Adjustable stops are provided for limiting the rotational movement of the gate C.

Finally, the adjustment of the mechanical members ensuring the most perfect registering of the images recorded on the two faces of the film may necessitate:

(1) Strict parallelism of the axis of rotation of the film with the plane of the reflecting system and with the plane of the copy film.

(2) The arrangement of the axis of rotation orthogonal to the main optical axis of the copying objective.

(3) Finally the observance of an exact value of the angle of movement of the gate C. These adjustments are made once and for all by using, for example, on the side of the original, in substitution for the original to be copied, suitable optical measuring devices, and, on the side of the copy, in substitution for the copy film, a transparent ground glass plate of the same thickness as the copy film and provided with lines in the form of a grating from which, with the aid of magnifying glasses provided for the purpose, the image of the measuring device on the side of the original may be registered accurately in the two respective positions C and C' of the exposure gate.

I claim:

1. Apparatus for projection copying an original film bearing a plurality of separation records onto a copy film provided with a plurality of sensitised layers having different photographic properties, comprising a support for the original film, an optical copying system, a support for the copy film, a reflecting device, said support for the copy film and said reflecting device being pivoted about an axis perpendicular to the optical axis of the optical copying system, and means for swinging said support for the copy film from a plane perpendicular to the optical axis of the optical copying system through a predetermined angle and for bringing the reflecting device into a position such that its plane of reflection intersects said optical axis and bisects the angle through which the support for the copy film is swung.

2. Apparatus for projection copying an original film bearing a plurality of separation records onto a copy film provided with a plurality of sensitised layers having different photographic properties, comprising a support for an original film, an optical copying system, a support for a copy film, the latter support being pivoted about an axis perpendicular to the optical axis of the optical copying system, a mirror carried by said pivoted support, and means swinging the support for the copy film from a plane perpendicular to the optical axis of the optical copying system, through a predetermined angle, the plane of reflection of the mirror intersecting the said optical axis and bisecting the angle through which the support for the copy film is rotatable.

3. Apparatus for projection copying an original film bearing a plurality of separation records onto a copy film provided with a plurality of sensitised layers having different photographic properties, comprising a support for an original film, an optical copying system, a support for a copy film, the latter support being pivoted about an axis perpendicular to the optical axis of the optical copying system, a total reflection prism carried by said pivoted support, and means swinging the support for the copy film from a plane perpendicular to the optical axis of the optical copying system, through a predetermined angle, the plane of reflection of the total reflection prism intersecting the said optical axis and bisecting the angle through which the support for the copy film is rotatable.

4. Apparatus for projection copying an original lenticular film onto a copy film provided with a plurality of sensitised layers having different photographic properties, comprising a support for an original film, means for scanning the original film by illuminating relatively narrow portions of said film successively, an optical copying system having a relatively small angular aperture, a support for the copy film, a reflecting device, said support for the copy film and said reflecting device being pivoted about an axis perpendicular to the optical axis of the optical copying system, and means for swinging said support for the copy film from a plane perpendicular to the optical axis of the optical copying system through a predetermined angle and for bringing the reflecting device into a position such that its plane of reflection intersects said optical axis and bisects the angle through which the support for the copy film is swung.

5. In a projection printer, mechanism comprising a support for the copy film pivoted about an axis perpendicular to the principal optical axis of the printer, said support being adapted to be swung from a plane perpendicular to said principal optical axis into a plane extending laterally of said principal optical axis, and a reflecting device carried by said support, the reflecting surface of said device making an angle with the plane of the copy film equal to half the angle through which said support is adapted to be swung.

ANNE HENRI JACQUES
DE LASSUS ST. GENIES.